United States Patent [19]

Hubbell, III

[11] 3,946,764

[45] Mar. 30, 1976

[54] INSULATOR SLEEVE FOR CONDUITS
[75] Inventor: Franklin R. Hubbell, III, Brooklyn, Mich.
[73] Assignee: Tenneco Inc., Racine, Wis.
[22] Filed: July 22, 1974
[21] Appl. No.: 490,345

[52] U.S. Cl............................ 138/148; 138/149
[51] Int. Cl.² .......................................... F16L 9/14
[58] Field of Search.................... 60/20; 181/62; 138/110–117, 143, 149, 161, 148; 165/186; 137/15

[56] References Cited
UNITED STATES PATENTS

| 3,209,787 | 10/1965 | Brown et al. | 138/114 |
| 3,490,122 | 1/1970 | Hunder et al. | 137/15 |

Primary Examiner—Houston S. Bell, Jr.
Attorney, Agent, or Firm—Harness, Dickey & Pierce

[57] ABSTRACT

A metal sleeve is snapped transversely over an internal combustion engine exhaust system conduit to serve as a heat and/or sound insulator.

10 Claims, 4 Drawing Figures

INSULATOR SLEEVE FOR CONDUITS

BRIEF SUMMARY OF THE INVENTION

It is the purpose of this invention to provide an easily installed insulator that is suitable, in particular, for use on conduits of internal combustion engine exhaust systems.

The invention achieves this purpose by means of a metal insulator sleeve that extends around the conduit through an arc of about 270°, leaving an opening in the sleeve of about 90°. The opening is smaller than the diameter of the conduit to be covered but large enough to be elastically expanded to the width of the conduit so that the sleeve can be transversely slipped over the conduit. Preferably, the longitudinal edges of the opening are turned radially inwardly to assert a ratchet effect that resists removal of the sleeve. The sleeve may be radially spaced from the conduit to provide a gap for cooling air flow or it may be substantially an outer laminate to reduce pipe ring.

DESCRIPTION OF THE INVENTION

Figure 1:
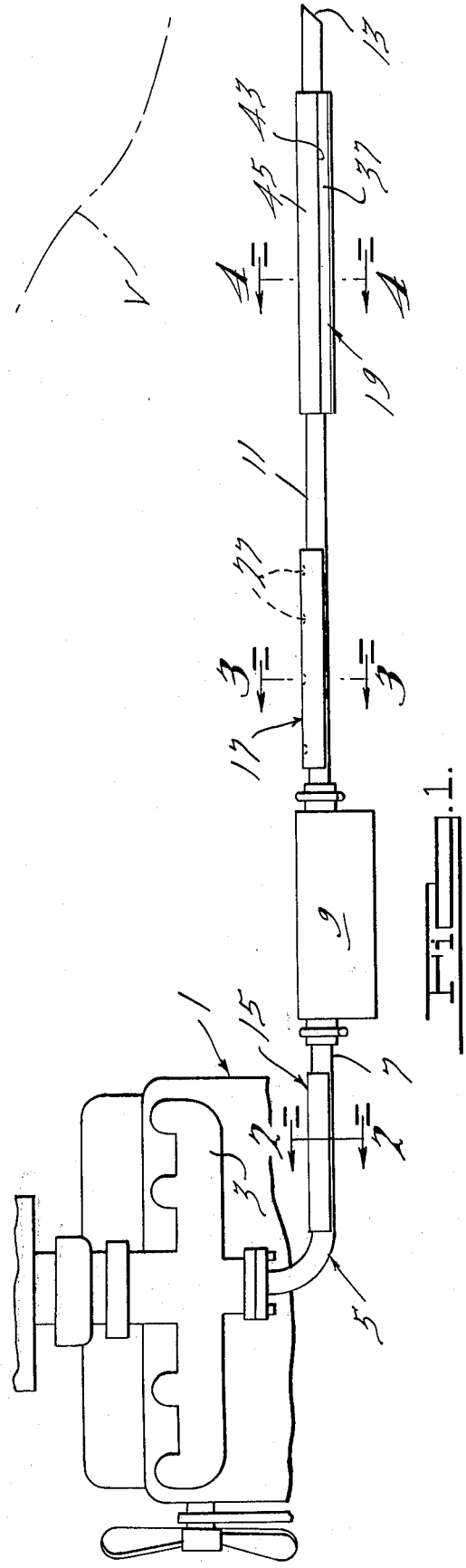
FIG. 1 is a schematic side elevation of an internal combustion engine for a motor vehicle (shown partially in phantom at V) having an exhaust system containing three embodiments of the invention.
Figure 4:
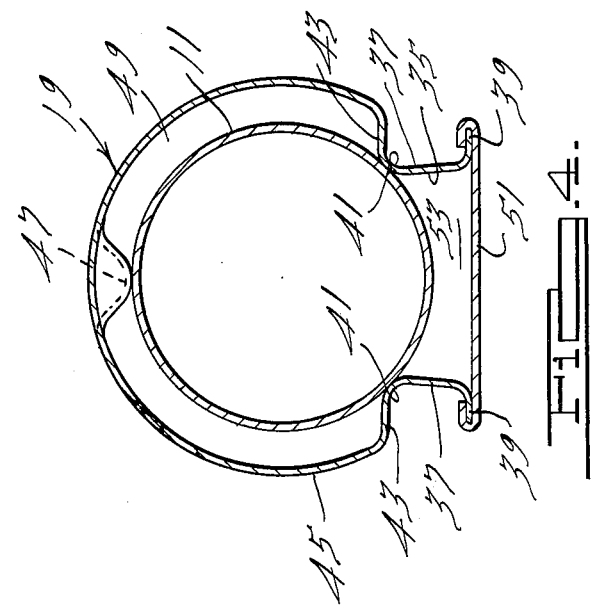
FIG. 4 is a cross section along the line 4—4 of FIG. 1 and shows a third form of the invention.
Figure 3:
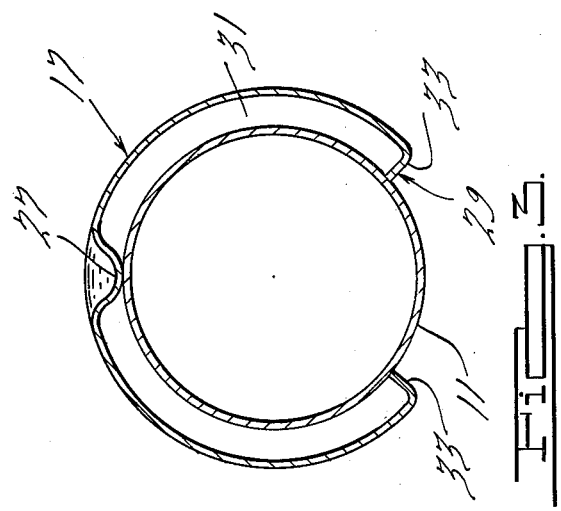
FIG. 3 is a cross section along the line 3—3 of FIG. 1 and shows another form of the invention.
Figure 2:
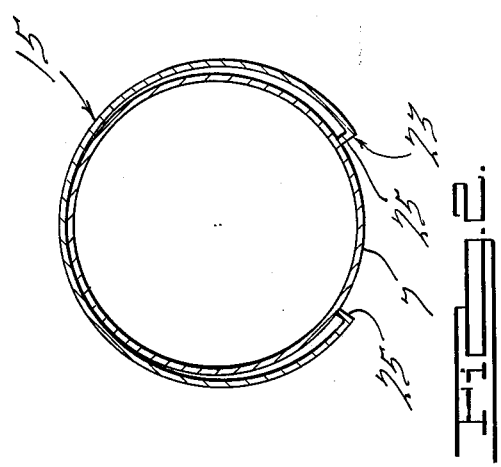
FIG. 2 is a cross section along the line 2—2 of FIG. 1 and shows one form of the invention.

An internal combustion engine 1 for a motor vehicle, such as an automobile, has an exhaust manifold 3 that delivers exhaust gases into the exhaust system 5. The system 5 has an exhaust pipe or conduit 7 connected at its upstream end to the manifold and at its downstream end to the inlet of a muffler or catalytic converter 9 of suitable construction. The system includes a tailpipe or conduit 11 connected to the outlet of the member 9 and opening to atmosphere at its downstream end 13. The exhaust system parts are conventionally made of metal. In actual installations the tailpipe usually has one or more bends in it, these being omitted for the sake of simplicity in the drawings. Sleeve 15 is mounted on exhaust pipe 7 and sleeves 17 and 19 are mounted on the tailpipe. These sleeves are made of metal, preferably low carbon steel, and illustrate three different forms of the invention. They are shown in cross section, respectively, in FIGS. 2, 3, and 4.

Sleeve 15 comprises a tubular member having an opening 23 that extends the full sleeve length along the bottom of the sleeve. It extends over an arc large enough so that its width can be expanded, by elastic circumferential expansion of the sleeve, to the outer diameter of the pipe 7, an arc of about 90° being illustrated. Thus the sleeve can be manually forced transversely across and over the pipe. This can be done after the exhaust system 5 is installed, if desired. The longitudinal edges of the opening 23 are turned in, as shown by flanges 25, to extend substantially radially to the pipe 7. This promotes ease of assembly since they tend to act as a funnel and also to provide significant holding power since they tend to dig into the surface of the pipe 7 and act as ratchet teeth. The flanges are preferably relatively short, preferably even shorter than illustrated, so that the sleeve is close to the surface of the pipe, practically a laminate. The sleeve, therefore, provides substantial acoustic attenuation and reduces pipe ring.

In the event that the unit 9 is a catalytic converter substantial heat will be released to the exhaust gas travelling through tailpipe 11. The sleeves 17 and 19 are designed to act as heat shields. Sleeve 19 is very similar to sleeve 15 but has a series of dimples 27 formed in it, diametrically opposite to the centerline of its opening 29, and these act to space the sleeve away from the surface of the tailpipe 11 and provide an air flow gap 31 around the pipe. Flanges 33 correspond to flanges 25 but are longer to maintain a substantially uniform width air flow gap. Since the gap 31 is open at both ends air can flow through it as the vehicle is moving to carry away heat from the tailpipe.

Sleeve 19 is similar to sleeve 17 but has the bottom closed so that it totally encloses a section of tailpipe. Thus, it comprises a tubular member that has a bottom opening 35 along its entire length that is defined by slightly diverging or tapered sides 37, for ease of installation, that have outwardly extending flanges 39 at their outer ends. The inner ends of the sides 37 blend into radii or corners 41 that contact the pipe 11 and are connected by lateral sections 43 to the circular portion 45 of the sleeve. The sleeve has spacing dimples 47 formed in it which contact the pipe on the side opposite the mouth 35 and act with the corners 41 to provide an air flow gap 49 extending around most of the pipe, about 270° being illustrated. A metal cover plate 51 as long as the sleeve and having rebent longitudinal side edges is slipped on to the flanges 39 to cover the opening 35 and provide an air flow gap 53 along the bottom of the tailpipe 11, about a 90° coverage being illustrated. The gaps 49 and 53 are open at opposite ends so that air can flow through them during vehicle movement. The plate 51 may be imperforate or, to promote cooling, it may be expanded metal, a screen, or filled over its entire area with numerous perforations so that there is substantial air flow through it. It can be crimped, welded or otherwise fastened securely to flanges 39.

The invention therefore provides insulator sleeves for exhaust system conduits that can be slipped over the conduits at any time and snapped in place at the desired locations. They can be inserted from the bottom and then rotated 180° to the position illustrated so that maximum insulation is between the pipe and vehicle floor. Obviously, they can be of various lengths, or cut to length, to suit the desired usage. If desired to fix the sleeve in position, one or more of the dimples can be spotwelded to the pipe.

Modifications may be made without departing from the spirit and scope of the invention.

I claim:

1. An insulator for the gas flow conduit of an internal combustion engine exhaust system, comprising a one piece imperforate wall sheet metal insulator sleeve elastically expandable to increase its circumference and adapted to be assembled and mounted on a selected intermediate section along the length of the conduit by movement thereof transverse to its length and to that of the conduit, said sleeve having a conduit receiving opening along one side extending the full length of the sleeve, said opening being less in width than the conduit but expansible to a width greater than that of the conduit upon elastic circumferential expansion of the sleeve whereby said sleeve may be installed on the conduit by movement transverse to the length of the circuit.

2. The invention as set forth in claim 1 including radially inwardly extending flanges formed along the edges of said opening to provide holding means engaging the outer surface of the conduit.

3. The invention as set forth in claim 1 wherein said sleeve is closely fitted to the outer surface of the conduit to form substantially an outer laminate that serves to attenuate pipe ring.

4. The invention as set forth in claim 3 including radially inwardly extending flanges formed along the edges of said opening to provide holding means engaging the outer surface of the conduit.

5. The invention as set forth in claim 1 including radially inwardly extending projections formed on the sleeve to contact the conduit and provide an air gap open at opposite ends between the sleeve and conduit.

6. The invention as set forth in claim 5 including inwardly extending portions in longitudinal contact with the conduit and sides extending transversely to said portions, said portions and sides defining said opening, and a cover plate connected to said sides and defining therewith an air gap open at opposite ends extending along the length of the sleeve.

7. The invention as set forth in claim 6 wherein said sides diverge in an outwardly extending direction.

8. The invention as set forth in claim 1 wherein the two longitudinal edges of said opening along the full length of the sleeve are bent inwardly along radii of the sleeve to form flanges making right angle corners with the sleeve and diverging outwardly with respect to each other to form a tapered mouth to receive the conduit.

9. A sheet metal insulator member for assembly on a fluid flow conduit comprising a one piece sheet metal sleeve having a longitudinal axis and a body extending the full length of the member around and substantially concentric with said axis through an arc of substantially 270°, the remaining substantially 90° arc of said member being open to form a longitudinally extending mouth running the full length of the member, said sleeve being elastically expandable to increase its circumference so that said opening is expansible to a width greater than that of the conduit whereby the sleeve may be installed on the conduit by movement substantially normal to the axis of the sleeve.

10. An insulator member as set forth in claim 9 including portions of said sleeve defining said opening extending angularly to the sleeve and into contact with a conduit when the sleeve is installed on a conduit.

* * * * *